(12) United States Patent
Wu et al.

(10) Patent No.: US 10,699,611 B2
(45) Date of Patent: Jun. 30, 2020

(54) PROJECTOR AND BRIGHTNESS ADJUSTING METHOD

(71) Applicant: QISDA CORPORATION, Taoyuan (TW)

(72) Inventors: Jia-Zhen Wu, Taoyuan (TW); Chih-Wei Cho, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/409,850

(22) Filed: May 12, 2019

(65) Prior Publication Data

US 2020/0168137 A1 May 28, 2020

(30) Foreign Application Priority Data

Nov. 23, 2018 (CN) .......................... 2018 1 1404994

(51) Int. Cl.
  *G09G 3/00* (2006.01)
  *H04N 9/31* (2006.01)
(52) U.S. Cl.
  CPC .......... *G09G 3/001* (2013.01); *H04N 9/3182* (2013.01); *G09G 2320/0233* (2013.01); *G09G 2320/0673* (2013.01); *G09G 2360/144* (2013.01)

(58) Field of Classification Search
  CPC .......... G09G 3/001; G09G 2320/0673; G09G 2320/0233; G09G 2360/144; H04N 9/3182
  See application file for complete search history.

(56) References Cited

U.S. PATENT DOCUMENTS

| | | | |
|---|---|---|---|
| 2005/0190142 A1* | 9/2005 | Ferguson | |
| 2012/0038892 A1* | 2/2012 | Kurtz et al. | |
| 2015/0070337 A1* | 3/2015 | Bell et al. | |
| 2017/0353703 A1* | 12/2017 | Guo et al. | |

* cited by examiner

*Primary Examiner* — Abhishek Sarma

(57) ABSTRACT

A projector includes a light sensor, a micromirror device, a light source and a processor. The light sensor senses an ambient brightness. The micromirror device is controlled by a duty cycle. The light source is controlled by a driving current. The processor receives an image including a plurality of non-black pixels. When a brightness of at least one of the non-black pixels is lower than the ambient brightness, the processor increases one of the duty cycle and the driving current. When the brightness of at least one of the non-black pixels is still lower than the ambient brightness after adjustment, the processor increases another one of the duty cycle and the driving current. When the brightness of at least one of the non-black pixels is still lower than the ambient brightness after adjustment, the processor performs an image processing process for the brightness of the non-black pixels.

12 Claims, 7 Drawing Sheets

```
┌─────────────────────────────────────────────────┐
│ Shift a brightness distribution curve of the    │
│ non-black pixels in the brightness distribution │
│ diagram of the image to find out a maximum      │
│ area of the brightness distribution curve       │──S180
│ between the ambient brightness and the extreme  │
│ brightness or find out a minimum area of the    │
│ brightness distribution curve beyond the        │
│ ambient brightness and the extreme brightness   │
└─────────────────────────────────────────────────┘
                        ↓
┌─────────────────────────────────────────────────┐
│ Define a dark area and a bright area located    │
│ beyond the ambient brightness and the extreme   │
│ brightness in the brightness distribution       │──S182
│ diagram according to the maximum area or the    │
│ minimum area                                    │
└─────────────────────────────────────────────────┘
                        ↓
┌─────────────────────────────────────────────────┐
│ Set the brightness of the non-black pixels of   │
│ the dark area in the brightness distribution    │
│ diagram to be the ambient brightness and set    │
│ the brightness of the non-black pixels of the   │──S184
│ bright area in the brightness distribution      │
│ diagram to be the extreme brightness            │
└─────────────────────────────────────────────────┘
```

FIG. 3

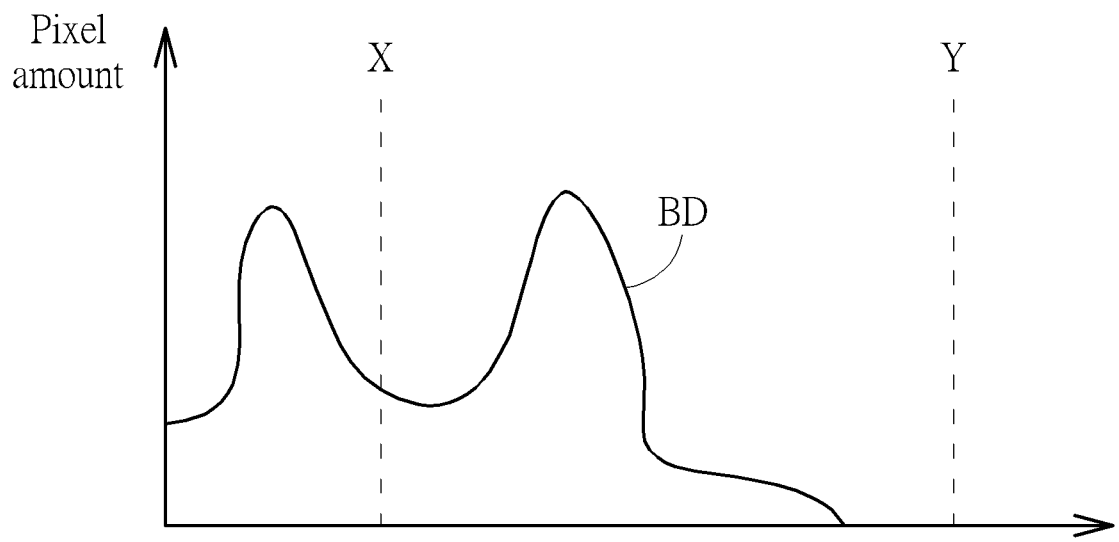

FIG. 4

PROJECTOR AND BRIGHTNESS ADJUSTING METHOD

BACKGROUND OF THE INVENTION

1. Field of the Invention

The invention relates to a projector and a brightness adjusting method and, more particularly, to a projector and a brightness adjusting method capable of adjusting a brightness of an image according to an ambient brightness.

2. Description of the Prior Art

Recently, projectors are getting more and more popular. With the capacity of video playing, projectors are applied not only for common office meetings, but also for various seminars or academic courses. When the projector is used in different environments, the image quality will be affected by an ambient brightness. For example, when the projector projects an image in a bright environment, the details of a dark area in the image will be affected by the ambient brightness and then disappear, such that only a black shadow is shown in the image. Accordingly, how to adjust the brightness of the image according to the ambient brightness has become a significant research issue.

SUMMARY OF THE INVENTION

An objective of the invention is to provide a projector and a brightness adjusting method capable of adjusting a brightness of an image according to an ambient brightness, so as to solve the aforesaid problems.

According to an embodiment of the invention, a projector comprises a light sensor, a micromirror device, a light source and a processor, wherein the processor is electrically connected to the light sensor, the micromirror device and the light source. The light sensor senses an ambient brightness. The micromirror device is controlled by a duty cycle. The light source is controlled by a driving current. The processor receives an image and the image comprises a plurality of non-black pixels. When a brightness of at least one of the non-black pixels is lower than the ambient brightness, the processor increases one of the duty cycle and the driving current. When the brightness of at least one of the non-black pixels is still lower than the ambient brightness after adjustment, the processor increases another one of the duty cycle and the driving current. When the brightness of at least one of the non-black pixels is still lower than the ambient brightness after adjustment, the processor performs an image processing process for the brightness of the non-black pixels according to the ambient brightness and an extreme brightness of the projector, such that the brightness of the non-black pixels is between the ambient brightness and the extreme brightness.

According to another embodiment of the invention, a brightness adjusting method is adapted to a projector. The projector comprises a micromirror device and a light source, wherein the micromirror device is controlled by a duty cycle and the light source is controlled by a driving current. The brightness adjusting method comprises steps of sensing an ambient brightness; receiving an image, wherein the image comprises a plurality of non-black pixels; when a brightness of at least one of the non-black pixels is lower than the ambient brightness, increasing one of the duty cycle and the driving current; when the brightness of at least one of the non-black pixels is still lower than the ambient brightness after adjustment, increasing another one of the duty cycle and the driving current; and when the brightness of at least one of the non-black pixels is still lower than the ambient brightness after adjustment, performing an image processing process for the brightness of the non-black pixels according to the ambient brightness and an extreme brightness of the projector, such that the brightness of the non-black pixels is between the ambient brightness and the extreme brightness.

As mentioned in the above, when the brightness of the non-black pixels in the image is lower than the ambient brightness, the invention may selectively increase the duty cycle of the micromirror device and/or increase the driving current of the light source, so as to increase the brightness of the non-black pixels. When the brightness of the non-black pixels is still lower than the ambient brightness after adjustment, the invention may further perform the image processing process for the brightness of the non-black pixels, so as to set the brightness of the non-black pixels to be between the ambient brightness and the extreme brightness of the projector. Accordingly, the invention can improve the details of the dark area in the image effectively and prevent the image from being affected by the ambient brightness as far as possible, so as to improve the image quality.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a flowchart illustrating an image processing process according to an embodiment of the invention.

FIG. 4 illustrates an original brightness distribution diagram of an image.

DETAILED DESCRIPTION

Figure 1:
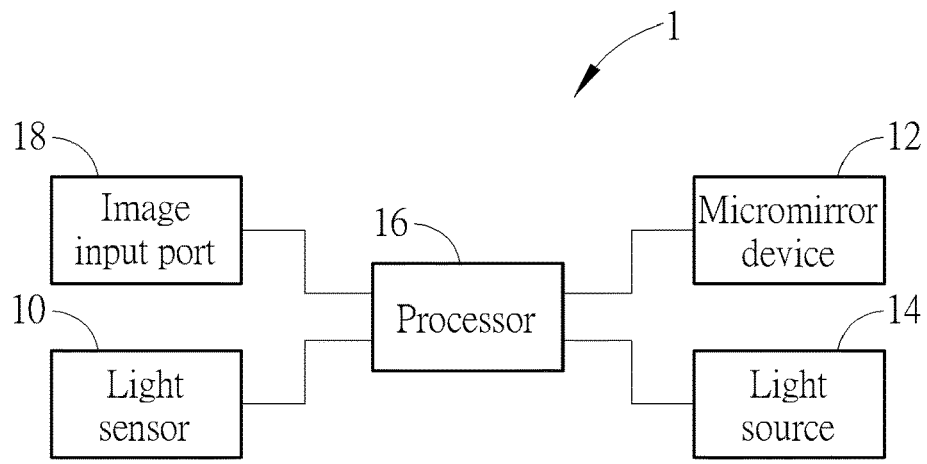
FIG. 1 is a functional block diagram illustrating a projector according to an embodiment of the invention.
Figure 2:
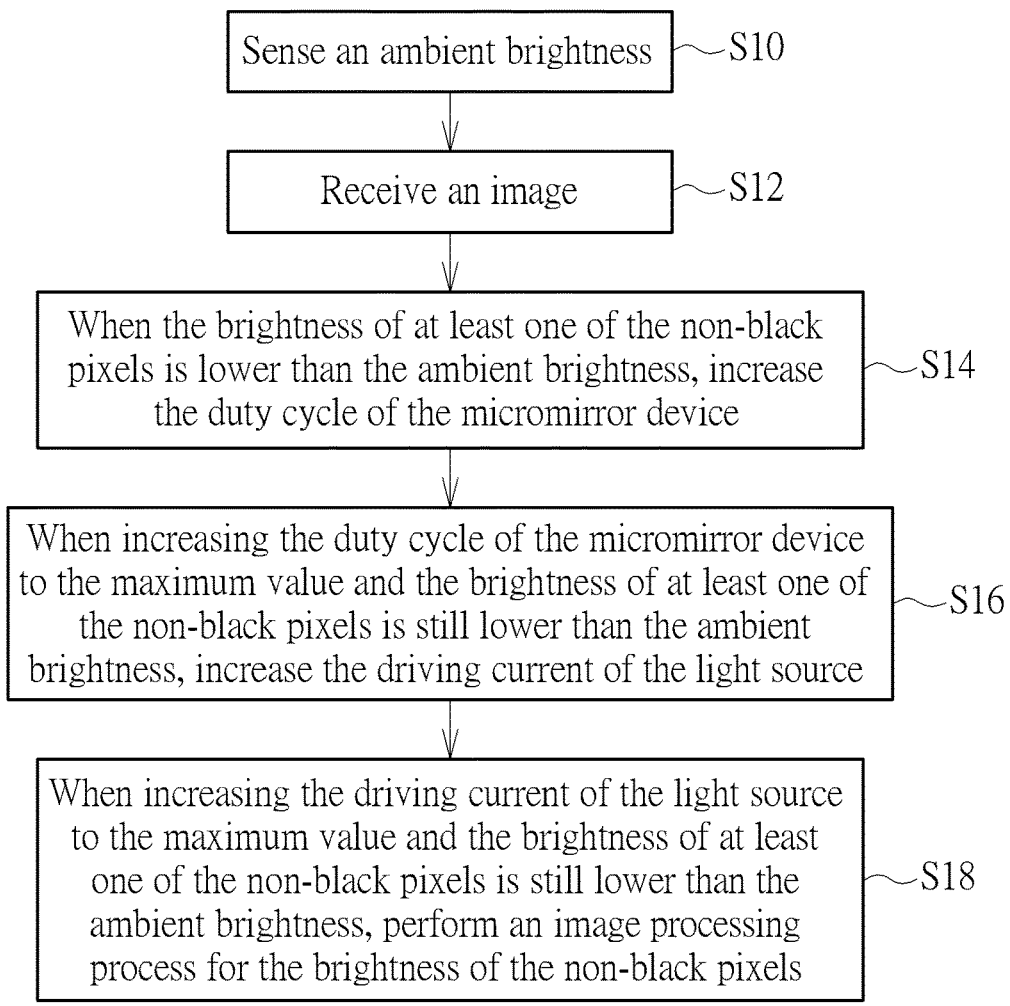
FIG. 2 is a flowchart illustrating a brightness adjusting method according to an embodiment of the invention.
Figure 5:
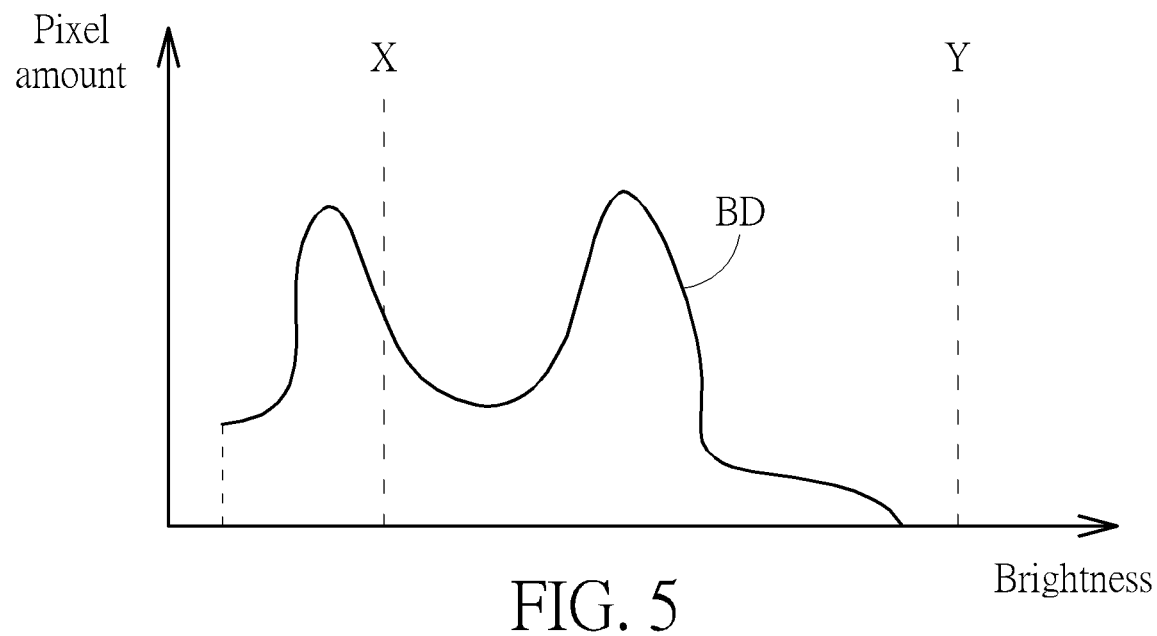
FIG. 5 illustrates a brightness distribution diagram after adjusting the duty cycle of the micromirror device to a maximum value.
Figure 6:
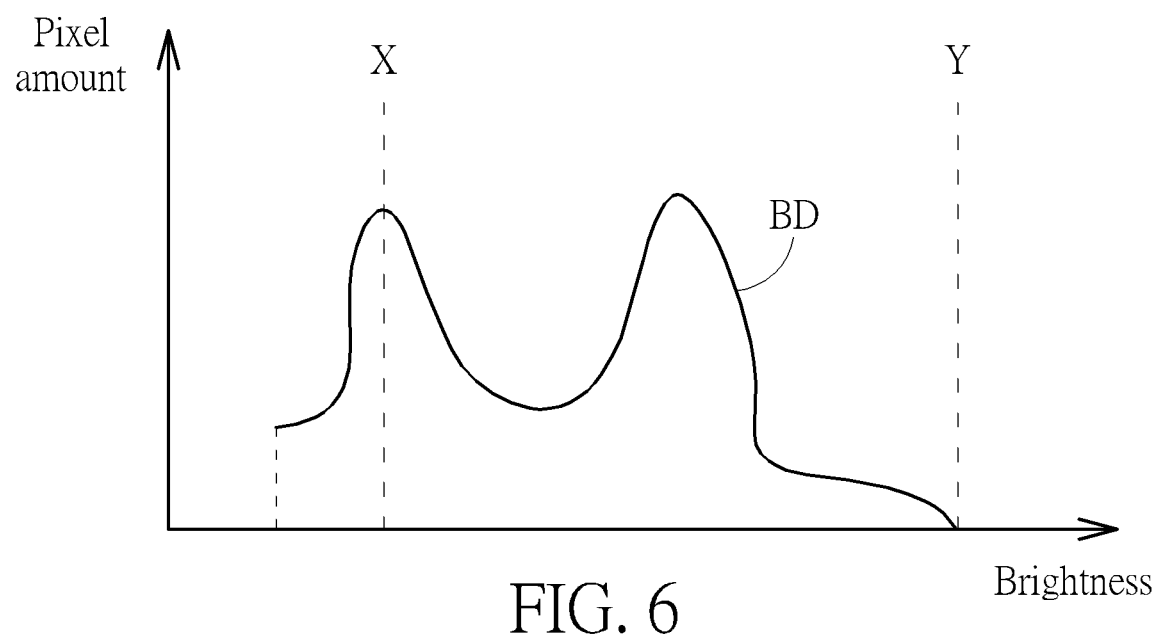
FIG. 6 illustrates a brightness distribution diagram after adjusting the driving current of the light source to a maximum value.
Figure 7:
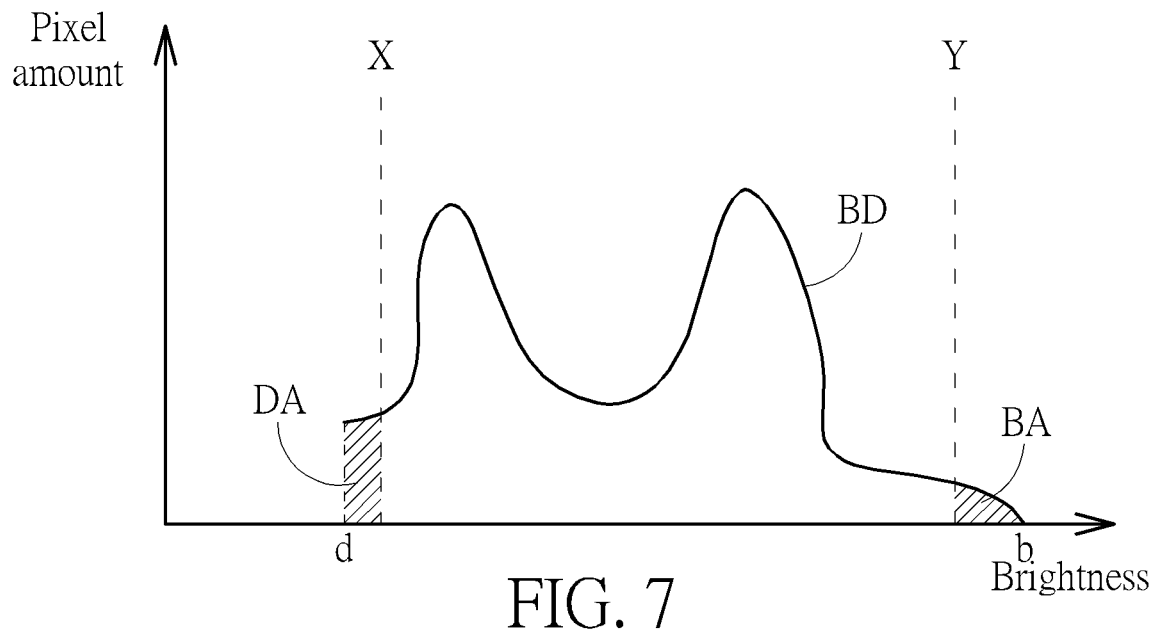
FIG. 7 illustrates a brightness distribution diagram after shifting the brightness distribution curve.
Figure 8:
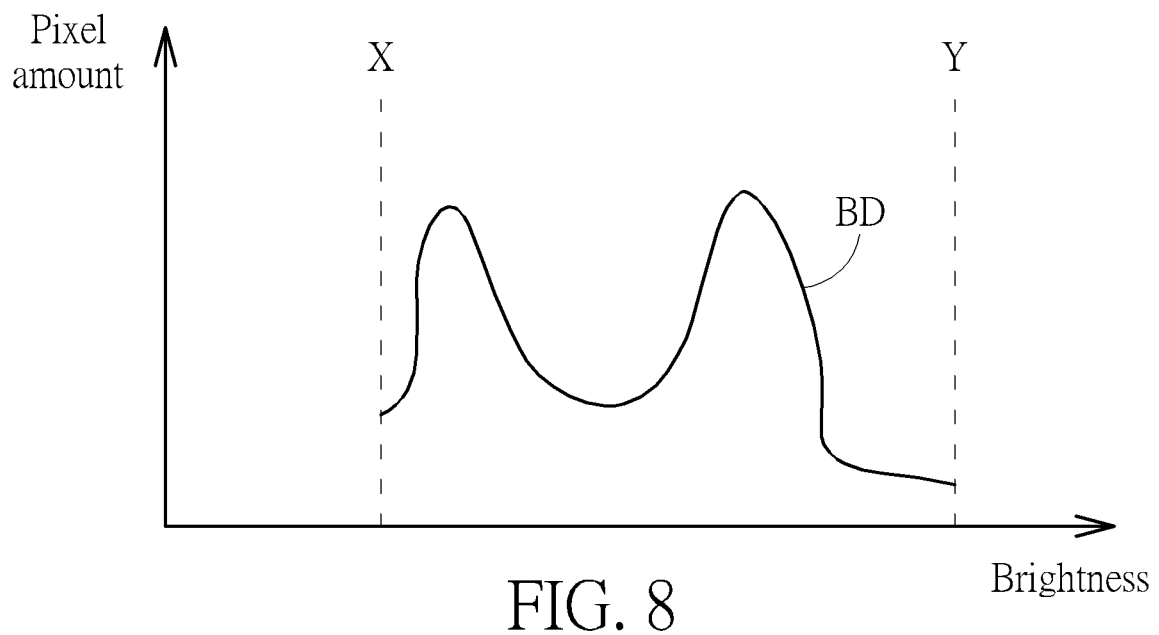
FIG. 8 illustrates a brightness distribution diagram showing that the brightness of the non-black pixels is between the ambient brightness and the extreme brightness.

Referring to FIGS. 1 to 8, FIG. 1 is a functional block diagram illustrating a projector 1 according to an embodiment of the invention, FIG. 2 is a flowchart illustrating a brightness adjusting method according to an embodiment of the invention, FIG. 3 is a flowchart illustrating an image processing process according to an embodiment of the invention, FIG. 4 illustrates an original brightness distribution diagram of an image, FIG. 5 illustrates a brightness distribution diagram after adjusting the duty cycle of the micromirror device 12 to a maximum value, FIG. 6 illustrates a brightness distribution diagram after adjusting the driving current of the light source 14 to a maximum value, FIG. 7 illustrates a brightness distribution diagram after shifting the brightness distribution curve, and FIG. 8 illustrates a brightness distribution diagram showing that the brightness of the non-black pixels is between the ambient brightness X and the extreme brightness Y. The brightness adjusting method shown in FIG. 2 is adapted to the projector 1 shown in FIG. 1.

As shown in FIG. 1, the projector 1 comprises a light sensor 10, a micromirror device 12, a light source 14 and a processor 16, wherein the processor 16 is electrically connected to the light sensor 10, the micromirror device 12 and the light source 14. In this embodiment, the light sensor 10 may be an ambient light sensor (ALS) or other sensors; the micromirror device 12 may be a digital micromirror device (DMD) or other mirror devices; the light source 14 may be a solid-state light source (e.g. laser, light emitting diode, etc.) or other light sources; and the processor 16 may be a processor or a controller with signal processing function. In general, the projector 1 may be further equipped with some necessary hardware or software components for specific purposes, such as a lens, a memory, an input/output port, applications, a circuit board, a power supply, a communication module, etc., and it depends on practical applications.

In general, the micromirror device 12 is controlled by a duty cycle and the light source 14 is controlled by a driving current. The processor 16 may adjust the duty cycle of the micromirror device 12 by a pulse width modulation (PWM) signal. Furthermore, the processor 16 may adjust the driving current of the light source 14 by a driving circuit (not shown). It should be noted that how to adjust the duty cycle of the micromirror device 12 by the PWM signal and how to adjust the driving current of the light source 14 by the driving circuit are well known by one skilled in the art, so those will not be depicted herein in detail.

In FIGS. 4 to 8, BD represents a brightness distribution curve of all pixels in an image, X represents an ambient brightness, and Y represents an extreme brightness of the projector 1. It should be noted that the extreme brightness of the projector 1 means that a maximum brightness of an image projected by the projector 1 when the duty cycle of the micromirror device 12 and the driving current of the light source 14 both are 100%.

When the projector 1 is turned on, the light sensor 10 senses an ambient brightness X (step S10 in FIG. 2). Then, the processor 16 receives an image through an image input port 18 (step S12 in FIG. 2), wherein the image comprises a plurality of non-black pixels. In this embodiment, the non-black pixel is a pixel with a gray level value unequal to 0. The invention is to adjust the brightness of the non-black pixels in the image. After receiving the image, the processor 16 may perform analysis and gather statistics for the image to obtain an original brightness distribution diagram of the image, as shown in FIG. 4.

When the brightness of the non-black pixels is higher than or equal to the ambient brightness X, it means that the ambient brightness X has a little effect on the details of the dark area in the image. At this time, the processor 16 may not adjust the brightness of the image.

When the brightness of at least one of the non-black pixels is lower than the ambient brightness X (as shown in FIG. 4), the processor 16 may increase the duty cycle of the micromirror device 12 first (step S14 in FIG. 2). In this embodiment, it is assumed that the duty cycle of the micromirror device 12 is lower than a maximum value (i.e. 100%). Accordingly, the processor 16 may increase the duty cycle of the micromirror device 12 by a predetermined ratio (e.g. 1%, 3%, etc.) gradually and then determine whether the brightness of the non-black pixels is higher than or equal to the ambient brightness X after adjustment every time. When the brightness of the non-black pixels is higher than or equal to the ambient brightness X after adjustment, it means that the ambient brightness X has a little effect on the details of the dark area in the image. At this time, the processor 16 may stop adjusting the brightness of the image.

When the processor 16 increases the duty cycle of the micromirror device 12 to the maximum value and the brightness of at least one of the non-black pixels is still lower than the ambient brightness X (as shown in FIG. 5), the processor 16 may further increase the driving current of the light source 14 (step S16 in FIG. 2). In this embodiment, the processor 16 may increase the driving current of the light source 14 by a predetermined ratio (e.g. 1%, 3%, etc.) gradually and then determine whether the brightness of the non-black pixels is higher than or equal to the ambient brightness X after adjustment every time. When the brightness of the non-black pixels is higher than or equal to the ambient brightness X after adjustment, it means that the ambient brightness X has a little effect on the details of the dark area in the image. At this time, the processor 16 may stop adjusting the brightness of the image.

When the processor 16 increases the driving current of the light source 14 to the maximum value and the brightness of at least one of the non-black pixels is still lower than the ambient brightness (as shown in FIG. 6), the processor 16 may further perform an image processing process for the brightness of the non-black pixels (step S18 in FIG. 2). In the following, FIGS. 3, 7 and 8 are used to depict how the aforesaid image processing process is performed.

To perform the image processing process, first, the processor 16 shifts a brightness distribution curve BD of the non-black pixels in the brightness distribution diagram of the image to find out a maximum area of the brightness distribution curve BD between the ambient brightness X and the extreme brightness Y or find out a minimum area of the brightness distribution curve BD beyond the ambient brightness X and the extreme brightness Y (step S180 in FIG. 3). Then, the processor 16 defines a dark area DA and a bright area BA located beyond the ambient brightness X and the extreme brightness Y in the brightness distribution diagram according to the maximum area or the minimum area (step S182 in FIG. 3), wherein the dark area DA is adjacent to the ambient brightness X and the bright area BA is adjacent to the extreme brightness Y, as shown in FIG. 7. In FIG. 7, d represents a minimum brightness of the dark area DA and b represents a maximum brightness of the bright area BA. In other words, d and b represent the minimum brightness and the maximum brightness of the brightness distribution curve BD, respectively.

The processor 16 may shift the brightness distribution curve BD in the brightness distribution diagram continuously (i.e. shift the minimum brightness d and the maximum brightness b) and set the brightness distribution curve BD to be a function F(x). At the same time, the processor 16 may use an equation 1 below to calculate the maximum area of the brightness distribution curve BD between the ambient brightness X and the extreme brightness Y or use an equation 2 below to calculate the minimum area of the brightness distribution curve BD beyond the ambient brightness X and the extreme brightness Y.

$$\text{The maximum area} = \text{MAX}\left(\int_X^Y F(x)dx\right). \qquad \text{Equation 1}$$

$$\text{The minimum area} = \text{MIN}\left(\int_d^X F(x)dx + \int_Y^b F(x)dx\right). \qquad \text{Equation 2}$$

After shifting the brightness distribution curve BD of the non-black pixels in the brightness distribution diagram of the image to a position shown in FIG. 7, the processor 16 may set the brightness of the non-black pixels of the dark area DA in the brightness distribution diagram to be the ambient brightness X and set the brightness of the non-black pixels of the bright area BA in the brightness distribution diagram to be the extreme brightness Y (step S184 in FIG. 3), such that the brightness of the non-black pixels is between the ambient brightness X and the extreme brightness Y (as shown in FIG. 8). Accordingly, the invention can improve the details of the dark area in the image effectively and prevent the image from being affected by the ambient brightness as far as possible, so as to improve the image quality.

It should be noted that the image may lose gradation and/or sharpness on the dark area and the bright area due to the aforesaid step S184. Therefore, after shifting the brightness distribution curve BD of the non-black pixels in the brightness distribution diagram of the image to the position shown in FIG. 7, the invention may perform a gamma correction for the brightness distribution curve BD.

Figure 9:
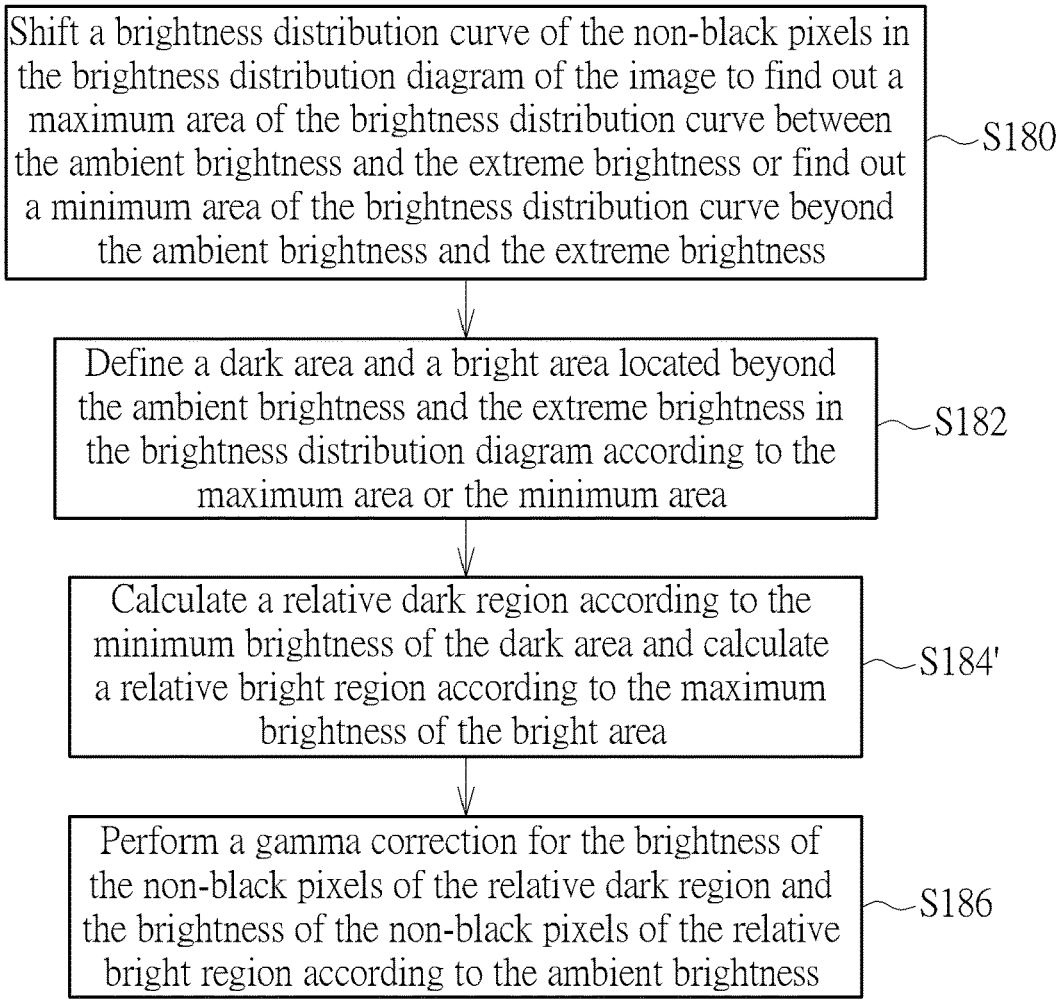
FIG. 9 is a flowchart illustrating an image processing process according to another embodiment of the invention.
Figure 10:
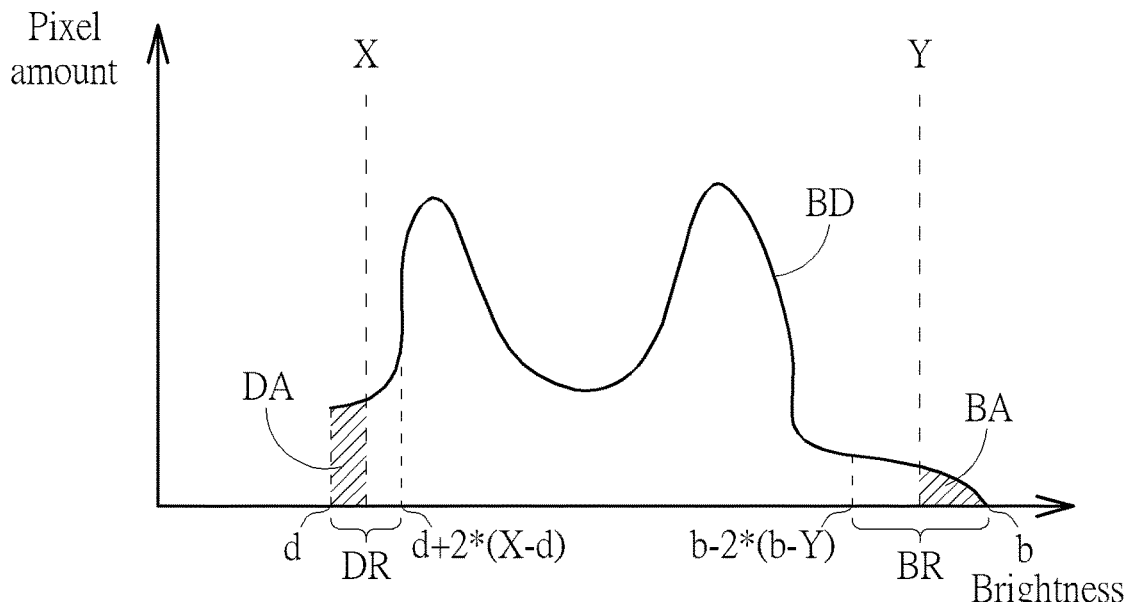
FIG. 10 illustrates a brightness distribution diagram showing a relative dark region and a relative bright region obtained according to the dark area and the bright area.
Figure 11:
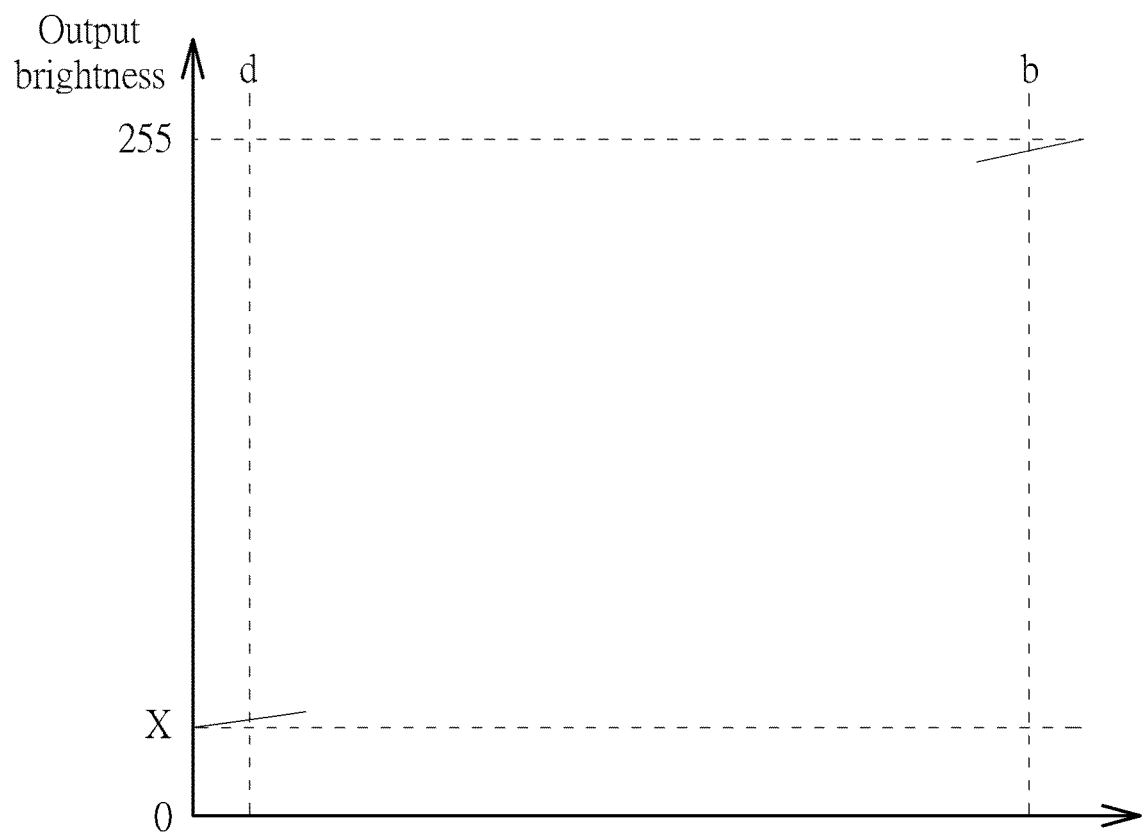
FIG. 11 illustrates a gamma correction curve set for the relative dark region and the relative bright region.
Figure 12:
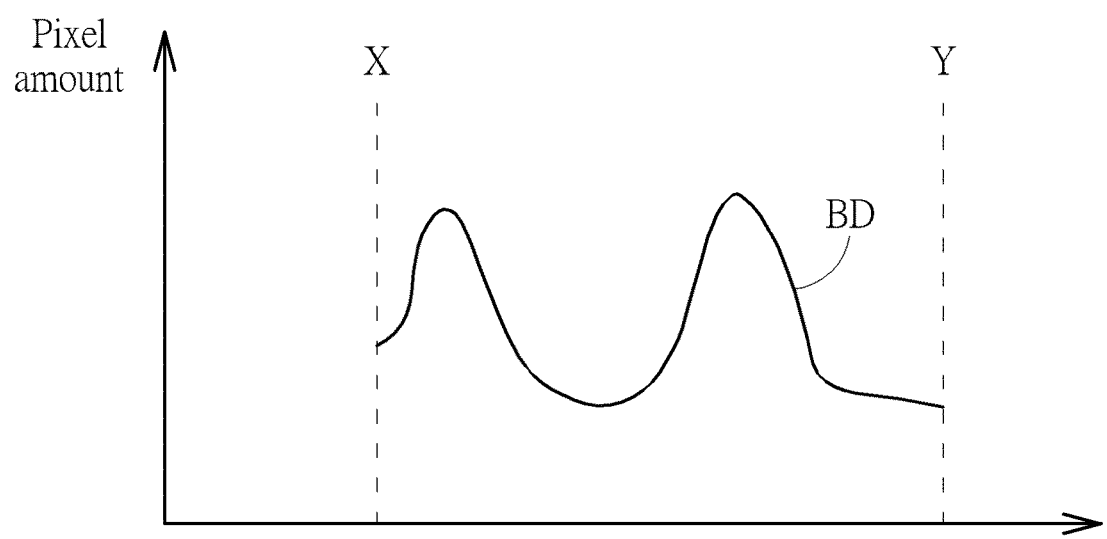
FIG. 12 illustrates a brightness distribution diagram after performing the gamma correction for the brightness distribution curve.

Referring to FIGS. 9 to 12, FIG. 9 is a flowchart illustrating an image processing process according to another embodiment of the invention, FIG. 10 illustrates a brightness distribution diagram showing a relative dark region DR and a relative bright region BR obtained according to the dark area DA and the bright area BA, FIG. 11 illustrates a gamma correction curve set for the relative dark region DR and the relative bright region BR, and FIG. 12 illustrates a brightness distribution diagram after performing the gamma correction for the brightness distribution curve BD. It should be noted that the steps S180, S182 shown in FIG. 9 are identical to the steps S180, S182 shown in FIG. 3, so those will not be depicted herein again.

After shifting the brightness distribution curve BD of the non-black pixels in the brightness distribution diagram of the image to the position shown in FIG. 7, the processor 16 may calculate a relative dark region DR according to the minimum brightness d of the dark area DA and calculate a relative bright region BR according to the maximum brightness b of the bright area BA (step S184' in FIG. 9). In this embodiment, a range of the relative dark region DR may be [d, d+2*(X−d)] and a range of the relative bright region BR may be [b−2*(b−Y), b], as shown in FIG. 10. It should be noted that the ranges of the relative dark region DR and the relative bright region BR may be set according to practical applications, so those are not limited to the aforesaid embodiment.

Then, the processor 16 may perform a gamma correction for the brightness of the non-black pixels of the relative dark region DR and the brightness of the non-black pixels of the relative bright region BR according to the ambient brightness X (step S186 in FIG. 9). In this embodiment, the processor 16 may use the gamma correction curve shown in FIG. 11 to perform the gamma correction for the brightness of the non-black pixels of the relative dark region DR and the brightness of the non-black pixels of the relative bright region BR. Furthermore, the processor 16 may use a general gamma correction curve to perform the gamma correction for the brightness of the non-black pixels between the relative dark region DR and the relative bright region BR. After performing the aforesaid gamma correction, the brightness of the non-black pixels is between the ambient brightness X and the extreme brightness Y (as shown in FIG. 12), and the dark area and the bright area in the image have more gradation.

Figure 13:
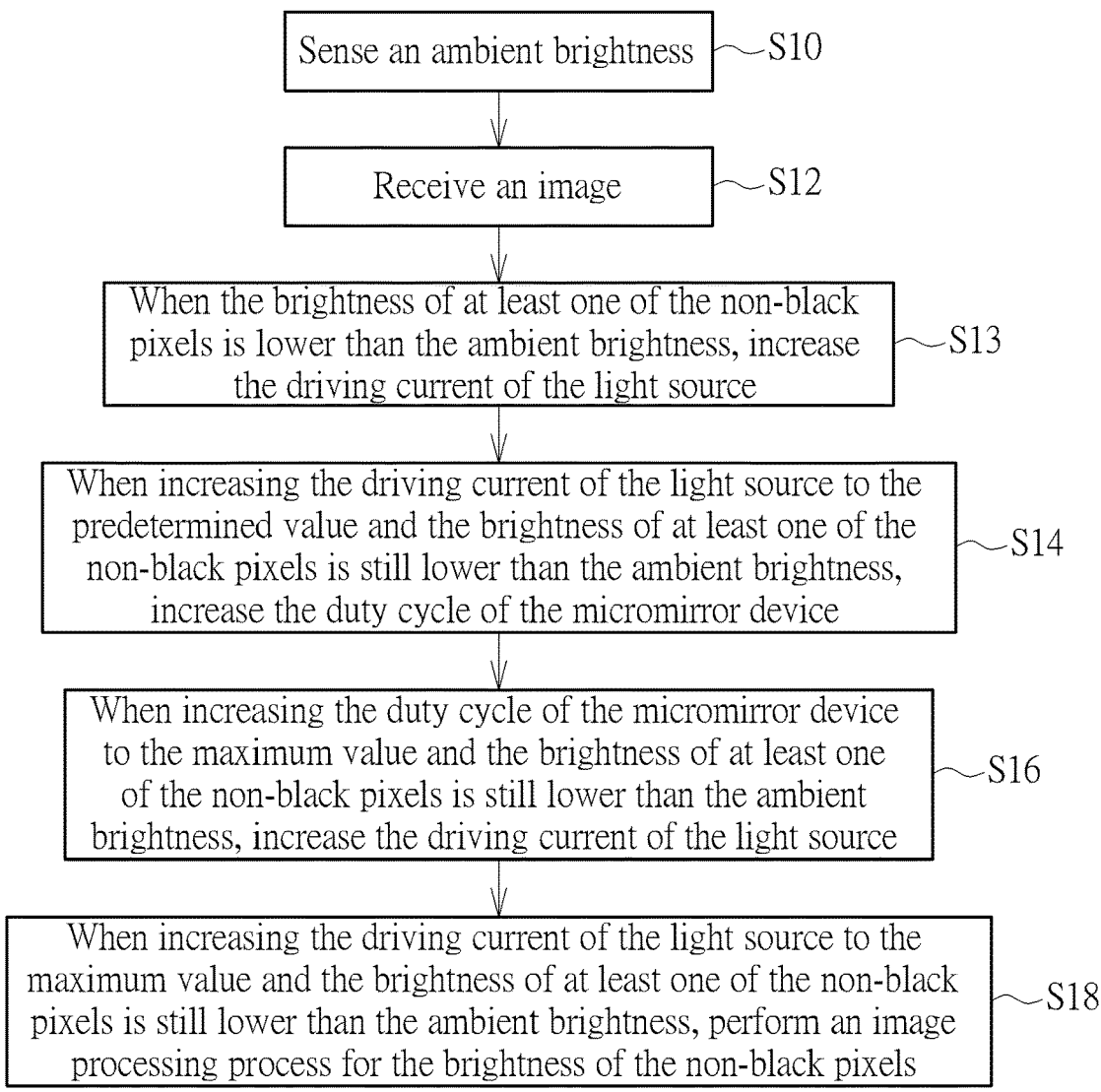
FIG. 13 is a flowchart illustrating a brightness adjusting method according to another embodiment of the invention.
Figure 14:
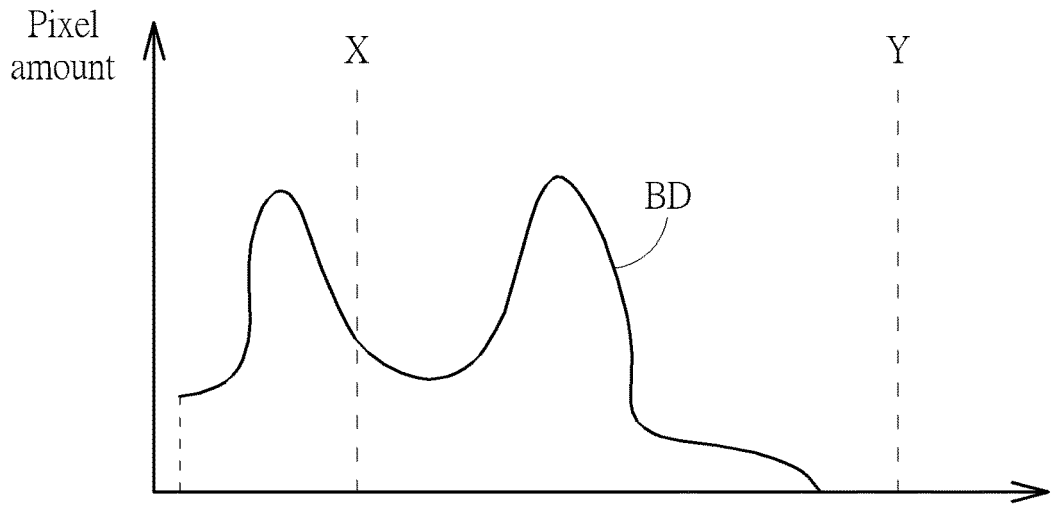
FIG. 14 illustrates a brightness distribution diagram after adjusting the duty cycle of the micromirror device to a predetermined value.

Referring to FIGS. 13 and 14, FIG. 13 is a flowchart illustrating a brightness adjusting method according to another embodiment of the invention and FIG. 14 illustrates a brightness distribution diagram after adjusting the duty cycle of the micromirror device 12 to a predetermined value. The brightness adjusting method shown in FIG. 13 is also adapted to the projector 1 shown in FIG. 1.

The main difference between the brightness adjusting method shown in FIG. 13 and the brightness adjusting method shown in FIG. 2 is that the brightness adjusting method shown in FIG. 13 increases the driving current of the light source 14 first (step S13) after receiving the image (step S12). For further illustration, after receiving the image, the processor 16 may increase the driving current of the light source 14 (step S13 in FIG. 13) when the brightness of at least one of the non-black pixels is lower than the ambient brightness X (as shown in FIG. 4). In this embodiment, it is assumed that the driving current of the light source 14 is 60%. Accordingly, the processor may increase the driving current of the light source 14 by a predetermined ratio (e.g. 1%, 3%, etc.) gradually and then determine whether the brightness of the non-black pixels is higher than or equal to the ambient brightness X after adjustment every time. When the brightness of the non-black pixels is higher than or equal to the ambient brightness X after adjustment, it means that the ambient brightness X has a little effect on the details of the dark area in the image. At this time, the processor 16 may stop adjusting the brightness of the image.

If the driving current of the light source 14 increases to the maximum value (i.e. 100%), the eyes of a user may feel uncomfortable. Therefore, the processor 16 may increase the driving current of the light source 14 to a predetermined value (e.g. 80%) first, wherein the predetermined value of the driving current is smaller than the maximum value of the driving current. When the processor 16 increases the driving current of the light source 14 to the predetermined value and the brightness of at least one of the non-black pixels is still lower than the ambient brightness X (as shown in FIG. 14), the processor 16 may further increase the duty cycle of the micromirror device 12 (step S14 in FIG. 13). When the processor 16 increases the duty cycle of the micromirror device 12 to the maximum value (i.e. 100%) and the brightness of at least one of the non-black pixels is still lower than the ambient brightness X (as shown in FIG. 5), the processor 16 may further increase the driving current of the light source 14 (step S16 in FIG. 13). When the processor 16 increases the driving current of the light source 14 to the maximum value (i.e. 100%) and the brightness of at least one of the non-black pixels is still lower than the ambient brightness X (as shown in FIG. 6), the processor 16 may further perform the image processing process for the brightness of the non-black pixels (step S18 in FIG. 13). It should be noted that the steps S14-S18 shown in FIG. 13 are identical to the steps S14-S18 shown in FIG. 2, so those will not depicted herein again. Furthermore, the image processing processes shown in FIGS. 3 and 9 are also adapted to the image processing process recited in step S18 of FIG. 13.

It should be noted that each part or function of the control logic of the brightness adjusting method of the invention may be implemented by a combination of software and hardware.

As mentioned in the above, when the brightness of the non-black pixels in the image is lower than the ambient brightness, the invention may selectively increase the duty cycle of the micromirror device and/or increase the driving current of the light source, so as to increase the brightness of the non-black pixels. When the brightness of the non-black pixels is still lower than the ambient brightness after adjustment, the invention may further perform the image processing process for the brightness of the non-black pixels, so as to set the brightness of the non-black pixels to be between the ambient brightness and the extreme brightness of the projector. Accordingly, the invention can improve the details of the dark area in the image effectively and prevent the image from being affected by the ambient brightness as far as possible, so as to improve the image quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
a light sensor sensing an ambient brightness;
a micromirror device controlled by a duty cycle;
a light source controlled by a driving current; and
a processor electrically connected to the light sensor, the micromirror device and the light source;
wherein the processor receives an image and the image comprises a plurality of non-black pixels; when a brightness of at least one of the non-black pixels is lower than the ambient brightness, the processor increases one of the duty cycle and the driving current; when the brightness of at least one of the non-black pixels is still lower than the ambient brightness after adjustment, the processor increases another one of the duty cycle and the driving current; when the brightness of at least one of the non-black pixels is still lower than the ambient brightness after adjustment, the processor performs an image processing process for the brightness of the non-black pixels according to the ambient brightness and an extreme brightness of the projector, such that the brightness of the non-black pixels is between the ambient brightness and the extreme brightness.

2. The projector of claim 1, wherein when the brightness of at least one of the non-black pixels is lower than the ambient brightness, the processor increases the duty cycle; when the processor increases the duty cycle to a maximum value and the brightness of at least one of the non-black pixels is still lower than the ambient brightness, the processor increases the driving current; when the processor increases the driving current to a maximum value and the brightness of at least one of the non-black pixels is still lower than the ambient brightness, the processor performs the image processing process for the brightness of the non-black pixels.

3. The projector of claim 1, wherein when the brightness of at least one of the non-black pixels is lower than the ambient brightness, the processor increases the driving current; when the processor increases the driving current to a predetermined value and the brightness of at least one of the non-black pixels is still lower than the ambient brightness, the processor increases the duty cycle; when the processor increases the duty cycle to a maximum value and the brightness of at least one of the non-black pixels is still lower than the ambient brightness, the processor increases the driving current; when the processor increases the driving current to a maximum value and the brightness of at least one of the non-black pixels is still lower than the ambient brightness, the processor performs the image processing process for the brightness of the non-black pixels; the predetermined value of the driving current is smaller than the maximum value of the driving current.

4. The projector of claim 1, wherein the image processing process comprises:
the processor shifting a brightness distribution curve of the non-black pixels in a brightness distribution diagram of the image to find out a maximum area of the brightness distribution curve between the ambient brightness and the extreme brightness or find out a minimum area of the brightness distribution curve beyond the ambient brightness and the extreme brightness;
the processor defining a dark area and a bright area located beyond the ambient brightness and the extreme brightness in the brightness distribution diagram according to the maximum area or the minimum area, wherein the dark area is adjacent to the ambient brightness and the bright area is adjacent to the extreme brightness; and
the processor setting the brightness of the non-black pixels of the dark area in the brightness distribution diagram to be the ambient brightness and setting the brightness of the non-black pixels of the bright area in the brightness distribution diagram to be the extreme brightness.

5. The projector of claim 1, wherein the image processing process comprises:
the processor shifting a brightness distribution curve of the non-black pixels in a brightness distribution diagram of the image to find out a maximum area of the brightness distribution curve between the ambient brightness and the extreme brightness or find out a minimum area of the brightness distribution curve beyond the ambient brightness and the extreme brightness;
the processor defining a dark area and a bright area located beyond the ambient brightness and the extreme brightness in the brightness distribution diagram according to the maximum area or the minimum area, wherein the dark area is adjacent to the ambient brightness and the bright area is adjacent to the extreme brightness;
the processor calculating a relative dark region according to a minimum brightness of the dark area and calculating a relative bright region according to a maximum brightness of the bright area; and
the processor performing a gamma correction for the brightness of the non-black pixels of the relative dark region and the brightness of the non-black pixels of the relative bright region according to the ambient brightness.

6. The projector of claim 5, wherein a range of the relative dark region is [d, d+2*(X−d)], a range of the relative bright region is [b−2*(b−Y), b], d represents the minimum brightness of the dark area, b represents the maximum brightness of the bright area, X represents the ambient brightness, and Y represents the extreme brightness.

7. A brightness adjusting method adapted to a projector, the projector comprising a micromirror device and a light source, the micromirror device being controlled by a duty cycle, the light source being controlled by a driving current, the brightness adjusting method comprising steps of:
sensing an ambient brightness;
receiving an image, wherein the image comprises a plurality of non-black pixels;
when a brightness of at least one of the non-black pixels is lower than the ambient brightness, increasing one of the duty cycle and the driving current;
when the brightness of at least one of the non-black pixels is still lower than the ambient brightness after adjustment, increasing another one of the duty cycle and the driving current; and
when the brightness of at least one of the non-black pixels is still lower than the ambient brightness after adjustment, performing an image processing process for the brightness of the non-black pixels according to the ambient brightness and an extreme brightness of the projector, such that the brightness of the non-black pixels is between the ambient brightness and the extreme brightness.

8. The brightness adjusting method of claim 7, wherein when the brightness of at least one of the non-black pixels is lower than the ambient brightness, the brightness adjusting method increases the duty cycle; when the duty cycle is increased to a maximum value and the brightness of at least one of the non-black pixels is still lower than the ambient brightness, the brightness adjusting method increases the driving current; when the driving current is increased to a maximum value and the brightness of at least one of the non-black pixels is still lower than the ambient brightness, the brightness adjusting method performs the image processing process for the brightness of the non-black pixels.

9. The brightness adjusting method of claim 7, wherein when the brightness of at least one of the non-black pixels is lower than the ambient brightness, the brightness adjusting method increases the driving current; when the driving current is increased to a predetermined value and the brightness of at least one of the non-black pixels is still lower than the ambient brightness, the brightness adjusting method increases the duty cycle; when the duty cycle is increased to a maximum value and the brightness of at least one of the non-black pixels is still lower than the ambient brightness, the brightness adjusting method increases the driving current; when the driving current is increased to a maximum value and the brightness of at least one of the non-black pixels is still lower than the ambient brightness, the brightness adjusting method performs the image processing process for the brightness of the non-black pixels; the predetermined value of the driving current is smaller than the maximum value of the driving current.

10. The brightness adjusting method of claim 7, wherein the image processing process comprises steps of:
shifting a brightness distribution curve of the non-black pixels in a brightness distribution diagram of the image to find out a maximum area of the brightness distribution curve between the ambient brightness and the extreme brightness or find out a minimum area of the brightness distribution curve beyond the ambient brightness and the extreme brightness;
defining a dark area and a bright area located beyond the ambient brightness and the extreme brightness in the brightness distribution diagram according to the maximum area or the minimum area, wherein the dark area is adjacent to the ambient brightness and the bright area is adjacent to the extreme brightness; and
setting the brightness of the non-black pixels of the dark area in the brightness distribution diagram to be the ambient brightness and setting the brightness of the non-black pixels of the bright area in the brightness distribution diagram to be the extreme brightness.

11. The brightness adjusting method of claim 7, wherein the image processing process comprises steps of:
shifting a brightness distribution curve of the non-black pixels in a brightness distribution diagram of the image to find out a maximum area of the brightness distribution curve between the ambient brightness and the extreme brightness or find out a minimum area of the brightness distribution curve beyond the ambient brightness and the extreme brightness;
defining a dark area and a bright area located beyond the ambient brightness and the extreme brightness in the brightness distribution diagram according to the maximum area or the minimum area, wherein the dark area is adjacent to the ambient brightness and the bright area is adjacent to the extreme brightness;
calculating a relative dark region according to a minimum brightness of the dark area and calculating a relative bright region according to a maximum brightness of the bright area; and
performing a gamma correction for the brightness of the non-black pixels of the relative dark region and the brightness of the non-black pixels of the relative bright region according to the ambient brightness.

12. The brightness adjusting method of claim 11, wherein a range of the relative dark region is [d, d+2*(X−d)], a range of the relative bright region is [b−2*(b−Y), b], d represents the minimum brightness of the dark area, b represents the maximum brightness of the bright area, X represents the ambient brightness, and Y represents the extreme brightness.

* * * * *